J. J. Stevenson,
Journal Lubricator.
N° 55,386. Patented June 5, 1866.

Witnesses.
A. Babbett.
M. S. Clark.

Inventor.
John J. Stevenson.

UNITED STATES PATENT OFFICE.

JOHN J. STEVENSON, OF AUBURN, NEW YORK.

IMPROVEMENT IN LUBRICATING JOURNALS.

Specification forming part of Letters Patent No. 55,386, dated June 5, 1866; antedated May 22, 1866.

*To all whom it may concern:*

Be it known that I, J. J. STEVENSON, of the city of Auburn, in the county of Cayuga and State of New York, have invented a new and useful Improvement in Mowing and Reaping Machines; and I do hereby declare the following is a full, clear, and exact description of the same, reference being had to the accompanying drawings, and to the letters of reference marked thereon, making part of this specification, in which—

Figure 1:
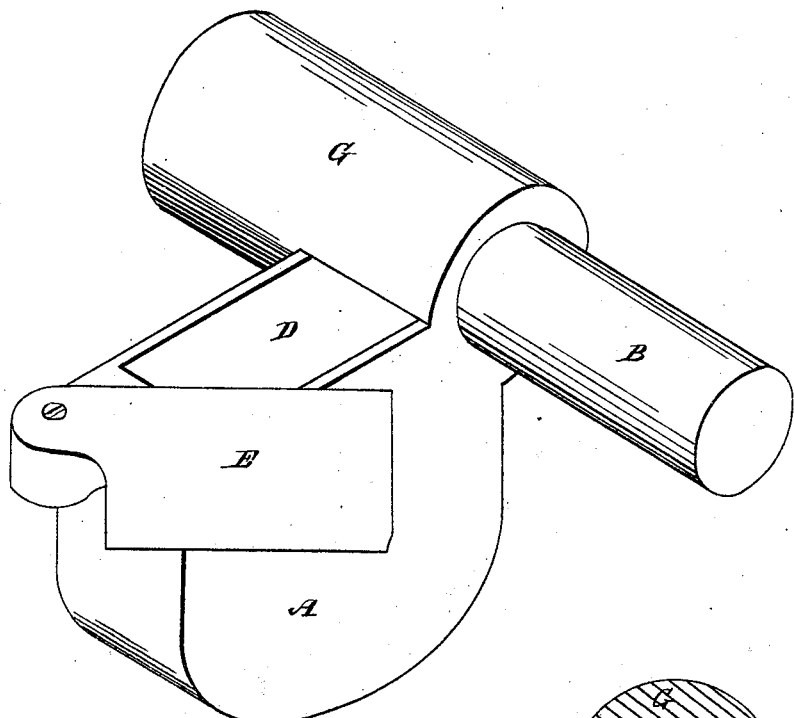
Figure 2:
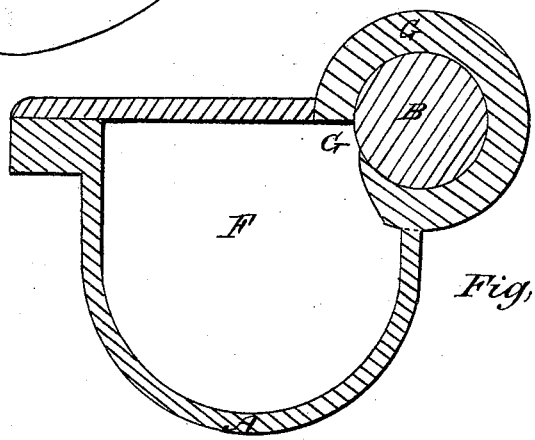

Figure 1 is a perspective view; Fig. 2, a vertical section taken through Fig. 1 in the center of the oil-box.

The object of this invention is to provide some easy and practical method of oiling the bearings, many of which in every mowing and reaping machine are liable to become dry, and when in that state, and before the operator is aware of it, the box or bearing, and perhaps both, are badly injured, if not rendered wholly unfit for use, by the abrasion or cutting of the one upon the other. This formidable difficulty presents itself much more in this kind of machine than any other—the great amount of dust and gritty matter afloat in the atmosphere underneath, through, and above the machine licks up the oil and absorbs everything in a fluid state with which it comes in contact. Now, in order to remove this difficulty I have applied to the boxes of the mowing and reaping machines the self-oiling box, and the application of the above box to the above machines will and does constitute the sum and essence of my invention.

And in order that others skilled in the art may make and use my invention, I will proceed to describe its construction and mode of operation.

In Fig. 1, A is the oil-cup, and G the box, both being cast of one piece of metal, and B the shaft. The oil-cup A is filled with cotton, or cotton-waste, or other fibrous material inserted into it through the opening at D, and then oil poured upon it until it becomes saturated therewith. The cover E is then turned over the opening, and all dust or floating particles of matter is thereby excluded from the cup.

Fig. 2 is a vertical section of the above, taken through the center of the oil-cup. The space F, Fig. 2, is the inside of the oil-cup; B, the shaft; G, the box, and A the oil-cup.

When the space is filled as above described, said oiled cotton or waste will come in contact with the shaft at G, and as the shaft is rotated it will draw the oil out of the saturated fibrous material and keep the shaft constantly and abundantly lubricated.

Now, I am aware that there has been a patent taken for a self-oiling box applied to the crank-pin of mowing and reaping machines, and I do not wish or intend to make this use of my invention; but

What I claim as new, and wish to secure by Letters Patent, is—

The application of the self-oiling cup or box to the bearings of mowing and reaping machines, when used as and for the purpose above specified.

JOHN J. STEVENSON.

Witnesses:
  A. BABBETT,
  M. S. CLARK.